United States Patent
Zhang et al.

(10) Patent No.: US 11,930,470 B2
(45) Date of Patent: Mar. 12, 2024

(54) SYSTEMS, METHODS, AND DEVICES FOR TIMING RECOVERY IN WIRELESS COMMUNICATIONS DEVICES

(71) Applicant: Cypress Semiconductor Corporation, San Jose, CA (US)

(72) Inventors: Yanbing Zhang, Basking Ridge, NJ (US); Hongwei Kong, Basking Ridge, NJ (US); Patrick Cruise, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 357 days.

(21) Appl. No.: 17/478,203

(22) Filed: Sep. 17, 2021

(65) Prior Publication Data

US 2023/0091958 A1    Mar. 23, 2023

(51) Int. Cl.
*H04W 56/00* (2009.01)
*H04W 4/80* (2018.01)

(52) U.S. Cl.
CPC ........... *H04W 56/005* (2013.01); *H04W 4/80* (2018.02)

(58) Field of Classification Search
CPC ............................. H04W 56/005; H04W 4/80
See application file for complete search history.

(56) References Cited

U.S. PATENT DOCUMENTS

| | | | | |
|---|---|---|---|---|
| 6,654,432 B1* | 11/2003 | O'Shea | ................ | H04W 84/14 |
| | | | | 375/354 |
| 8,687,747 B2* | 4/2014 | Knutson | ............. | H04W 56/005 |
| | | | | 375/343 |
| 10,999,811 B2* | 5/2021 | Lee | ..................... | H04W 56/005 |
| 2009/0135977 A1* | 5/2009 | Sheu | .................. | H04L 27/2662 |
| | | | | 375/150 |
| 2010/0142632 A1* | 6/2010 | Koo | .................... | H04L 27/2688 |
| | | | | 375/260 |
| 2017/0195152 A1* | 7/2017 | Chu | ....................... | H04L 27/22 |

* cited by examiner

*Primary Examiner* — Mounir Moutaouakil (57) ABSTRACT

Systems, methods, and devices estimate timing values for data transmission associated with wireless communications devices. Methods include receiving, at a transceiver of a wireless communications device, at least one symbol included in a data transmission, obtaining a plurality of samples of the at least one symbol, and generating, using one or more processors, a plurality of correlation values for each of the plurality of samples. Methods further include generating, using the one or more processors, a multi-sample interpolation model based on at least some of the plurality of correlation values and determining, using the one or more processors, an estimated maximum correlation value and a temporal offset value based on the multi-sample interpolation model, the temporal offset value being used for a time of arrival computation.

20 Claims, 7 Drawing Sheets

SYSTEMS, METHODS, AND DEVICES FOR TIMING RECOVERY IN WIRELESS COMMUNICATIONS DEVICES

TECHNICAL FIELD

This disclosure generally relates to wireless communications devices, and more specifically, to data timing recovery associated with wireless communications devices.

BACKGROUND

Wireless communications devices may communicate with each other via one or more communications modalities, such as a WiFi connection or a Bluetooth connection. Accordingly, such wireless communication may be implemented in a manner compliant with a wireless communication protocol. Moreover, such wireless communications devices may include various hardware components to facilitate such communication. For example, wireless communications devices may include transmission media and reception media that may include one or more antennas. Conventional techniques for synchronizing data transmissions between wireless communications devices and implementing timing recovery for such transmissions remain limited because they are limited in their ability to increase accuracy of such timing recover while avoiding implementation complexity and excess power usage.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may utilize data packets and data symbols represented by such data packets when communicating with each other. Moreover, symbol timing information may be used for the purposes of decoding received information. For example, such symbol timing information may be used by a decoder and/or demodulator to decode data that may have been encoded in accordance with a wireless transmission protocol, such as a Bluetooth transmission protocol. Conventional wireless communications devices are limited in their ability to accurately and precisely identify aspects of symbol timing, such as a precise time of arrival of a symbol.

Embodiments disclosed herein provide the ability to accurately and precisely determine symbol timing in an efficient manner. More specifically, correlation values may be computed based on samples obtained during a synchronization process. The correlation values may be used to generate an interpolation model, and the interpolation model may be used to identify an estimated peak correlation value and associated estimated time value. The use of the interpolation model enables the estimation of the time value with sub-sample resolution. The estimated time value may then be used for symbol timing recovery. In this way, samples and correlation values determined during synchronization operations may be used to refine an identification of a peak correlation, and additionally refine an associated time value that is used for symbol timing recovery.

Figure 1:
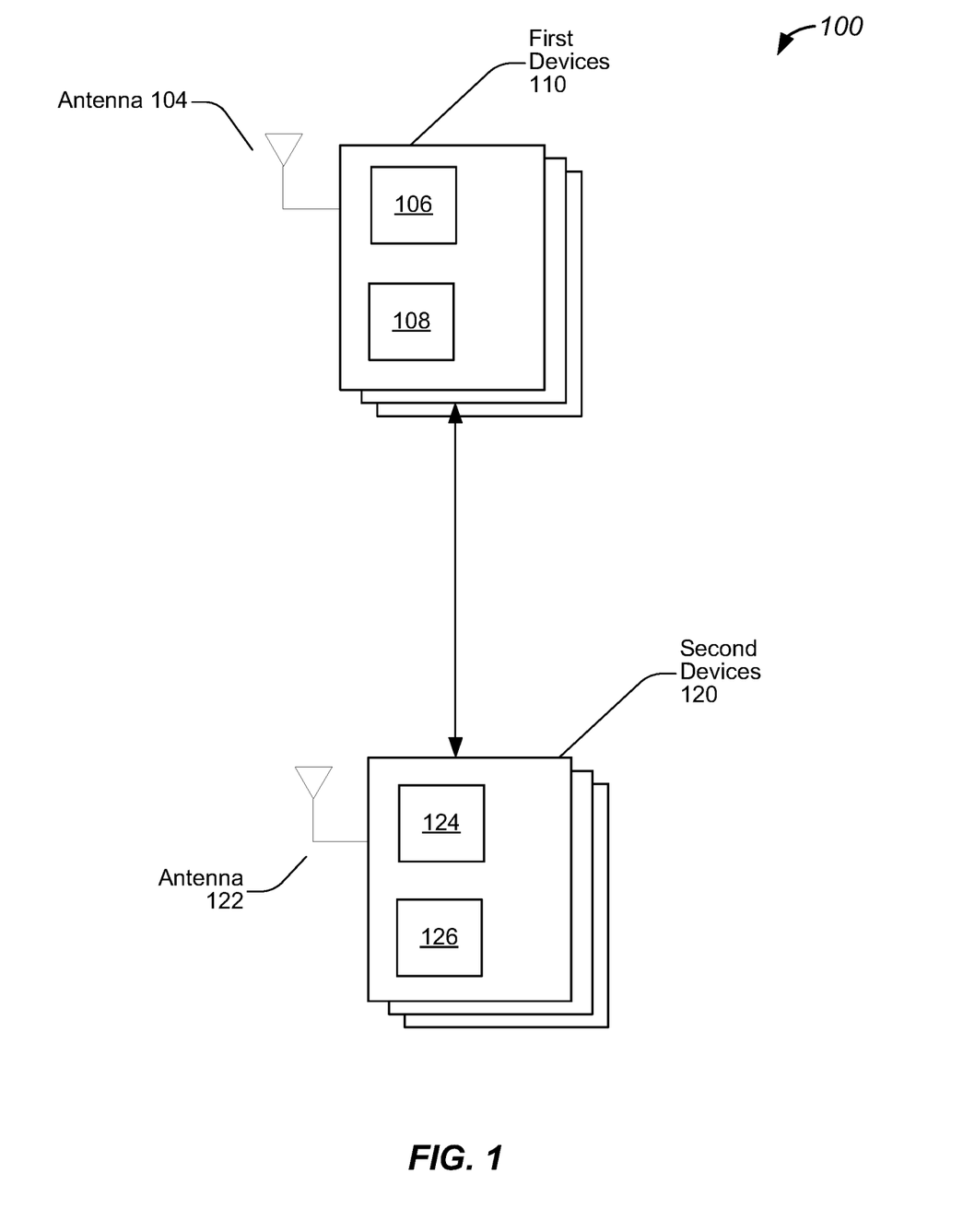
FIG. 1 illustrates an example of a system for timing recovery for wireless communications devices, configured in accordance with some embodiments.

FIG. 1 illustrates an example of a system for timing recovery for wireless communications devices, configured in accordance with some embodiments. As shown in FIG. 1, various wireless communications devices may communicate with each other via one or more wireless communications media. For example, wireless communications devices may communicate with each other via a Bluetooth connection. In various embodiments, the wireless communications devices may first establish connections or communications links before data transfer occurs. Once a communications link is established, packetized network traffic may be sent over a communications network. Accordingly, data packets may be sent and received between such wireless communications devices. As will be discussed in greater detail below, wireless communications devices disclosed herein and systems, such as system 100, that implement such wireless communications devices are configured to determine symbol timing of packetized data with increased accuracy. Accordingly, embodiments disclosed herein enable increased accuracy of timing determination and synchronization with reduced power consumption and reduced implementation complexity.

In various embodiments, system 100 may include first devices 110 which may be wireless communications devices. As discussed above, such wireless communications devices may be compatible with one or more wireless transmission protocols, such as a Bluetooth protocol. In some embodiments, first devices 110 are low energy Bluetooth devices that are compatible with a Bluetooth Low Energy specification and protocol, also referred to as Bluetooth Smart. The Bluetooth Low Energy protocol may have multiple operational modes, such as LE 1M, 2M, and LE Long Range (LELR). Moreover, such wireless communications devices may be smart devices, such as those found in wearable devices, or may be monitoring devices, such as those found in smart buildings, environmental monitoring, and energy management. For example, such devices may be industrial sensors, other sensors used in asset tracking, as well as any other suitable internet of things (IoT) device. Moreover, wireless communications devices may be any suitable device, such as those found in cars, other vehicles, and even medical implants.

As shown in FIG. 1, various wireless communications devices may be in communication with each other via one or more wireless communications mediums. As shown in FIG. 1, first devices 110 may each include an antenna, such as antenna 104. First devices 110 may also include processing device 108 as well as transceiver 106. As will be discussed in greater detail below, such processing devices, transceivers, and radios may be configured to send and receive data packets between each other, and utilize portions of data packets for the purposes of data packet detection and synchronization events. More specifically, as will be discussed in greater detail below with reference to FIG. 2-7, different components of first devices 110 may be configured to increase accuracy of symbol timing determination and synchronization with reduced power consumption and reduced implementation complexity.

In some embodiments, system 100 may further include second devices 120 which may also be wireless communications devices. As similarly discussed above, second devices 120 may be compatible with one or more wireless transmission protocols, such as a Bluetooth protocol. Moreover, second devices 120 may also be smart devices or other devices, such as IoT devices, devices found in cars, other vehicles, and medical implants. In various embodiments, second devices 120 may be different types of devices than first devices 110. As discussed above, each of second devices 120 may include an antenna, such as antenna 122, as well as processing device 126 and transceiver 124, which may also be configured to establish communications connections with other devices, and transmit and receive data in the form of data packets via such communications connections. Accordingly, as discussed above, second devices 120 may also be configured to increase accuracy of symbol timing determination and synchronization with reduced power consumption and reduced implementation complexity.

Figure 2:
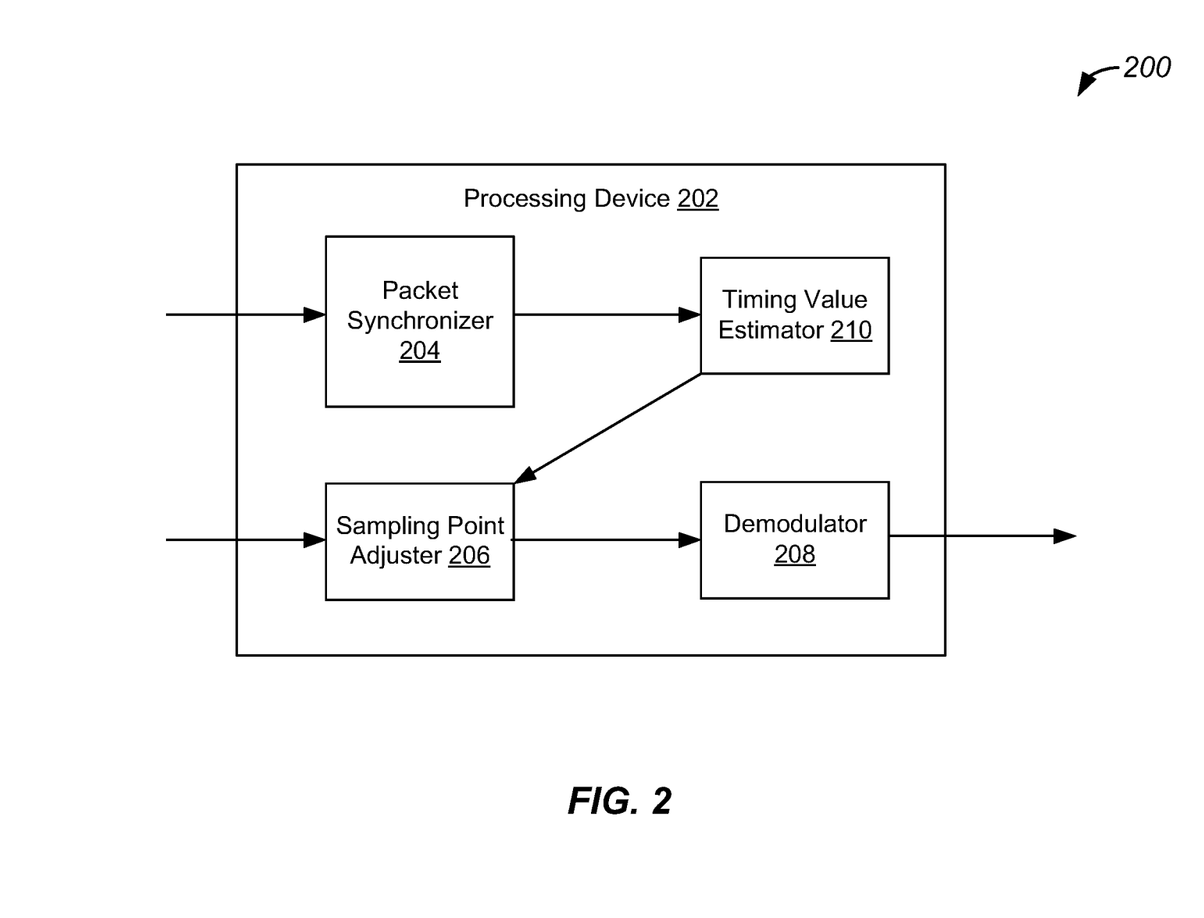
FIG. 2 illustrates an example of a device for timing recovery for wireless communications devices, configured in accordance with some embodiments.

FIG. 2 illustrates an example of a device for timing recovery for wireless communications devices, configured in accordance with some embodiments. As discussed above, wireless communications devices may include various components, such as processing devices that are configured to implement various operations associated with data packet reception, detection, and synchronization. Accordingly, as will be discussed in greater detail below, a processing device, such as processing device 202, may be included in a wireless communications device, and may be configured to receive data packets and identify a time at which a data symbol was received with increased accuracy.

In various embodiments, processing device 202 may include packet synchronizer 204 which is configured to implement one or more data packet synchronization operations in accordance with a transmission protocol, such as a Bluetooth transmission protocol. Accordingly, packet synchronizer 204 may be configured to implement synchronization operations to synchronize timing values associated with received data packets, and some other temporal reference, such as a system clock. In some embodiments, packet synchronizer 204 is configured to obtain a plurality of samples of received data at a given sampling rate. The samples may be used to compute a plurality of correlation values, where a plurality of correlation values is computed for each sample based on a plurality of shift values, and based on a comparison of the received, sampled data and a known data pattern used as a reference for synchronization purposes. For example, the known data pattern may be a designated sync pattern, such as a sync word. Samples may be taken of the received sync word and correlated with a reference sync word to generate correlation values corresponding to the each of the samples for the sync word. Accordingly, packet synchronizer 204 may generate correlation values identifying how well received samples correlate with a reference data pattern. Additional details regarding the computation of such correlation values is discussed in greater detail below with reference to FIG. 6.

Processing device 202 also includes timing value estimator 210 which is configured to generate an estimated timing value based, at least in part, on the correlation values discussed above. As will be discussed in additional detail below with reference to FIGS. 4-7, the timing value estimator 210 may use a portion of the correlation values to generate an estimated peak correlation value, and a time value associated with that estimated peak correlation value may be identified as the estimated timing value. More specifically, a peak correlation value may be identified based on the computed correlation values described above. For example, a sample may be identified that has a highest correlation value, and a time associated with that highest correlation value, as may be given by a time indicator, may also be identified. In various embodiments, a time indicator may be a relative measure of time, such as a time within a sampling period or a time between samples. Timing value estimator 210 may also retrieve data values for a designated number of nearest neighboring shift values, such as one shift value before the identified peak, and one shift value after the identified peak. While embodiments disclosed herein describe one shift value before and after the identified peak, any designated number, such as two or three, may be used.

Once the data values have been retrieved, timing value estimator 210 may be configured to implement one or more interpolation operations to generate a curve that may be a best fit curve configured to fit the data points. For example, three data points may have been retrieved corresponding to the peak correlation value as well as a shift value before and after the peak correlation value. The interpolation operation may be a multi-sample interpolation used to generate a parabola that is fit to the three data points. An estimated peak or apex of the parabola may then be identified based on the generated parabolic curve, and the estimated peak may be used to identify a corresponding estimated time. In this way, the interpolation operations may be applied to the obtained samples and correlation values to infer an estimated peak correlation value and time. The results may be returned as an estimated peak correlation value and an estimated time value.

Processing device 202 additionally includes sampling point adjuster 206 which may be configured to implement a temporal offset to sampled data to facilitate data synchronization. Accordingly, an output of timing value estimator 210 may be provided to sampling point adjuster 206, and may be used as a temporal offset value that enables the implementation of a temporal offset determined based on the computations described above. In this way, the estimated peak correlation value and the estimated time value may be used to implement packet synchronization with increased accuracy that may be a sub-sample accuracy, and with relatively little hardware and processing overhead.

In various embodiments, processing device 202 further includes demodulator 208 which is configured to implement one or more demodulation operations. Accordingly, encoded data included in received data packets may be decoded by, at least in part, demodulator 208, and an output of demodulator may be provided to other system components for data processing, as will be discussed in greater detail below with reference to FIG. 3. As discussed above, the received data handled by demodulator 208 may be synchronized data that has been adjusted based on the estimated time value discussed above.

Figure 3:
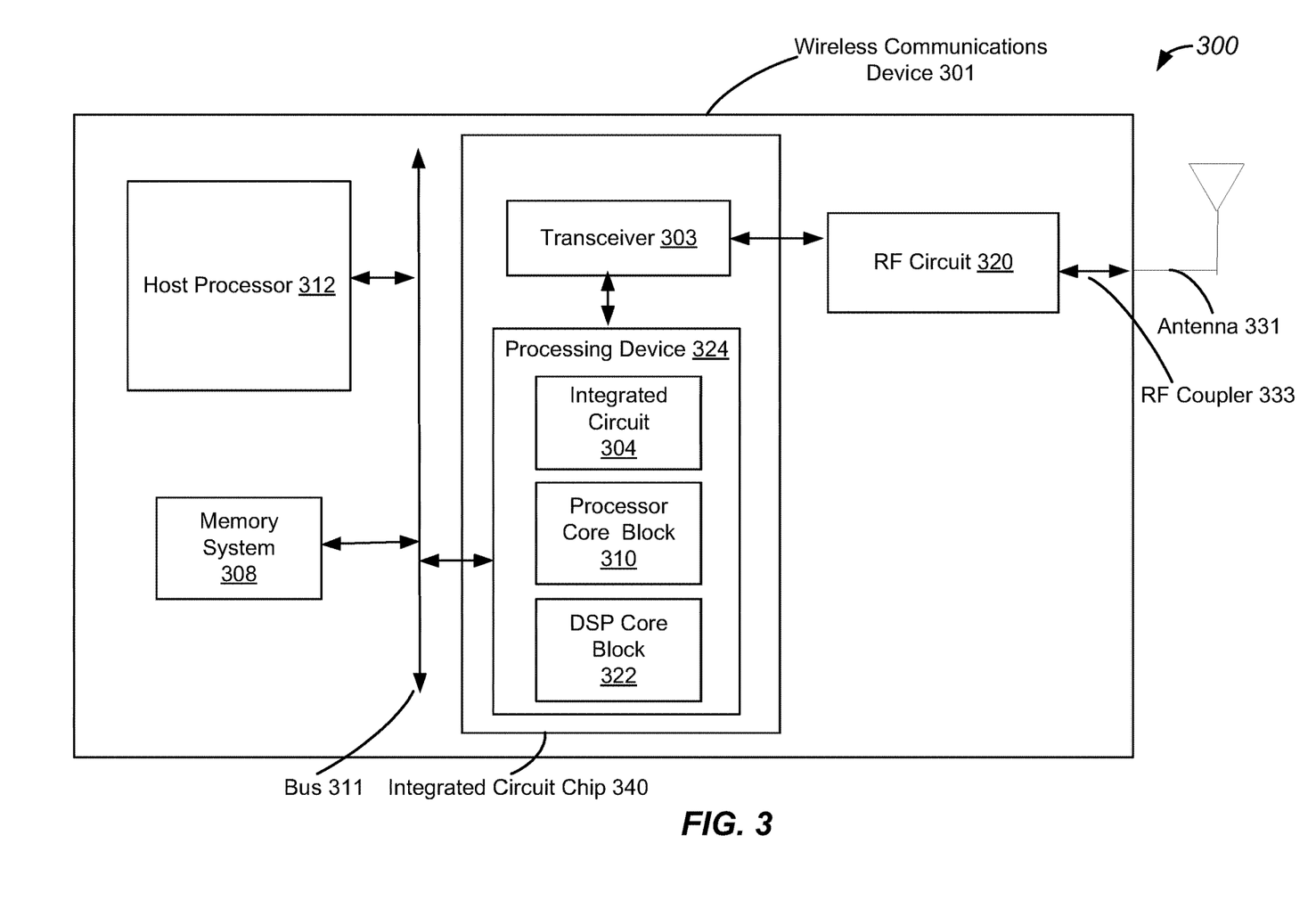
FIG. 3 illustrates an example of another system for timing recovery for wireless communications devices, configured in accordance with some embodiments.

FIG. 3 illustrates an example of another system for timing recovery for wireless communications devices, configured in accordance with some embodiments. More specifically, FIG. 3 illustrates an example of a system, such as system 300, that may include wireless communications device 301. It will be appreciated that wireless communications device 301 may be one of any of first devices 110 or second devices 120 discussed above. In various embodiments, wireless communications device 301 includes a transceiver, such as transceiver 303, which may be a transceiver such as transceivers 106 and 124 discussed above. In one example, system 300 includes transceiver 303 which is configured to transmit and receive signals using a communications medium that may include antenna 331. Accordingly, transceiver 303 may include a transmitter having one or more components forming a transmit path, and may also include a receiver having one or more components forming a receive path. As noted above, transceiver 303 may be included in a Bluetooth radio, and may be compatible with a Bluetooth Low Energy communications protocol. Accordingly, packets disclosed herein may be Bluetooth packets. In some embodiments, the packets may be Bluetooth Low Energy packets. Accordingly, transceiver 303 may include components, such as a modulator and demodulator as well as one or more buffers and filters, that are configured to generate signals and receive signals via antenna 331.

In various embodiments, system 300 further includes integrated circuit 304 which may include logic implemented using circuitry and/or one or more processor cores. Accordingly, integrated circuit 304 is configured to implement one or more components of processing device 324, such as the timing value estimator discussed above. Thus, integrated circuit 304 may include one or more components that are configured to implement timing computations discussed above and that will be described in greater detail below. While FIG. 3 illustrates integrated circuit 304 as separate from processor core block 310 discussed below, it will be appreciated that integrated circuit 304 may be implemented as part of processor core block 310 and may be included within processor core block 310.

Accordingly, system 300 includes processing device 324 which may include one or more processor cores. Moreover, processing device 324 may be configured to implement a controller. In various embodiments, processing device 324 includes one or more components configured to implement a medium access control (MAC) layer that is configured to control hardware associated with a wireless transmission medium, such as that associated with a Bluetooth transmission medium. Processing device 324 may also include one or more components configured to implement a physical layer (PHY layer) of the Bluetooth protocol. In one example, processing device 324 may include processor core block 310 that may be configured to implement a driver, such as a Bluetooth driver. Processing device 324 may further include digital signal processor (DSP) core block 322 which may be configured to include microcode.

In various embodiments, processor core block 310 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack and a controller stack are implemented using at least processor core block 310. The host stack is configured to include layers for a Bluetooth network encapsulation protocol, radio frequency communication, service discovery protocol, as well as various other high-level data layers. The controller stack is configured to include a link management protocol, a host controller interface, a link layer which may be a low energy link layer, as well as various other timing critical layers.

System 300 further includes radio frequency (RF) circuit 320 which is coupled to antenna 331. In various embodiments, RF circuit 320 may include various components such as an RF switch, a diplexer, and a filter. While FIG. 3 illustrates system 300 as having a single antenna, it will be appreciated that system 300 may have multiple antennas. Accordingly, RF circuit 320 may be configured to select an antenna for transmission/reception, and may be configured to provide coupling between the selected antenna, such as antenna 331, and other components of system 300 via a bus, such as bus 311.

System 300 includes memory system 308 which may include one or more memory devices configured to store one or more data values associated with timing computations discussed above and in greater detail below. Accordingly, memory system 308 includes storage device, which may be a non-volatile random access memory (NVRAM) configured to store such data values, and may also include a cache that is configured to provide a local cache. In various embodiments, system 300 further includes host processor 312 which is configured to implement processing operations implemented by system 300.

It will be appreciated that one or more of the above-described components may be implemented on a single chip, or on different chips. For example, transceiver 303 and processing device 324 may be implemented on the same integrated circuit chip, such as integrated circuit chip 340. In another example, transceiver 303 and processing device 324 may each be implemented on their own chip, and thus may be disposed separately as a multi-chip module or on a common substrate such as a printed circuit board (PCB). It will also be appreciated that components of system 300 may be implemented in the context of a low energy device, a smart device, an IoT device, or a vehicle such as an automobile. Accordingly, some components, such as integrated chip 320, may be implemented in a first location, while other components, such as antenna 331, may be implemented in second location, and coupling between the two may be implemented via a coupler such as RF coupler 333.

Figure 4:
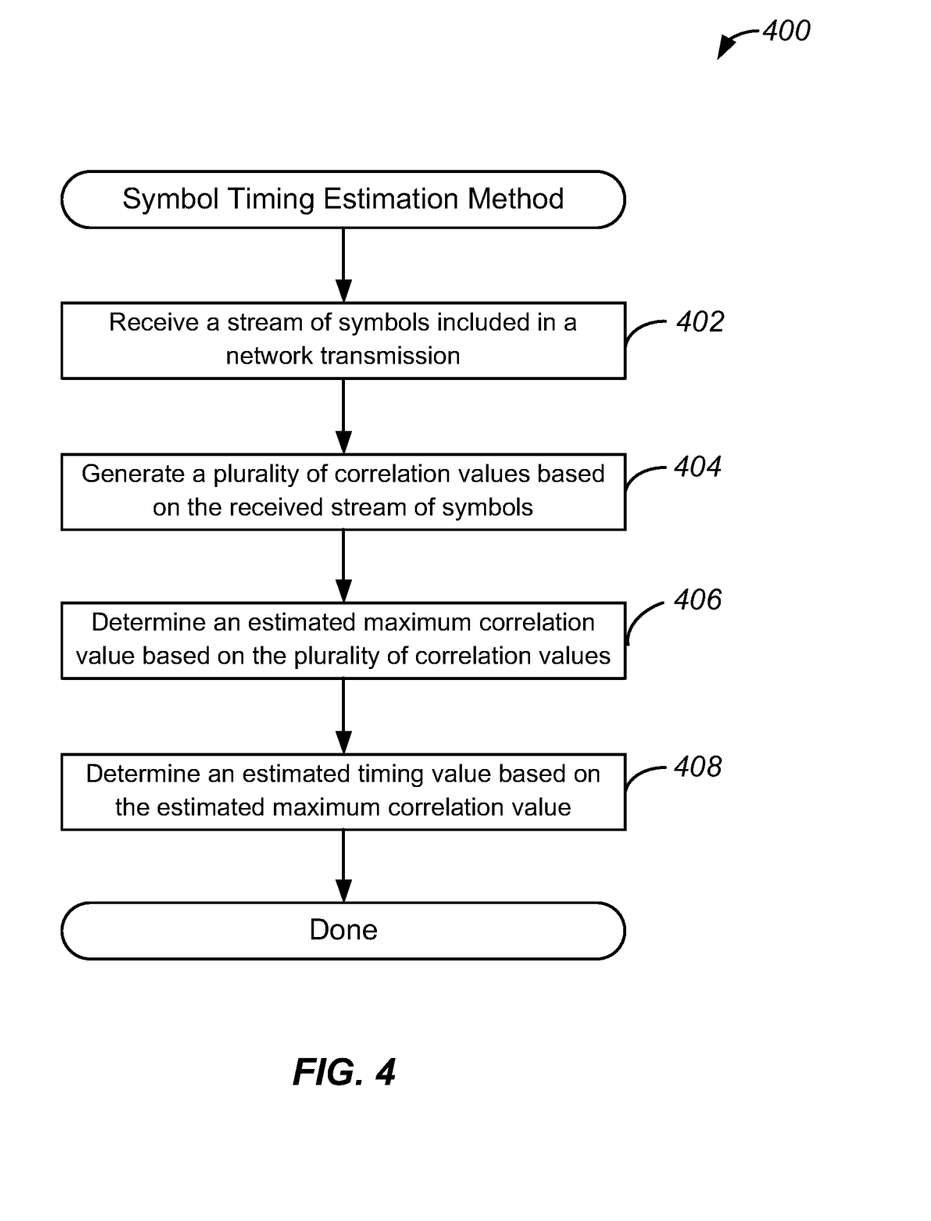
FIG. 4 illustrates an example of a method for timing recovery for wireless communications devices, implemented in accordance with some embodiments.

FIG. 4 illustrates an example of a method for timing recovery for wireless communications devices, implemented in accordance with some embodiments. As discussed above, transceivers may implement various operations associated with data packet reception, detection, and synchronization. As will be discussed in greater detail below, a method, such as method 400, may be implemented to receive data packets and identify a time at which a data symbol was received with increased accuracy.

Accordingly, method 400 may commence with operation 402 during which a stream of symbols may be received. As discussed above, a wireless communications device may be in communication with another wireless communications device and may receive a network transmission from that device. The network transmission may include a data stream that includes various data packets including data in the form of data symbols. Accordingly, during operation 402, a plurality of data symbols may be received, and one or more symbols may be used to implement synchronization operations, as similarly discussed above with reference to a designated data pattern, such as a sync data pattern or sync word.

Method 400 may proceed to operation 404 during which a plurality of correlation values may be generated based, at least in part, on the received stream of symbols. As also previously discussed, correlation values may be generated for each of the samples to identify how well the received samples correlate with the reference data pattern. Moreover, a peak correlation value may be identified, and a time associated with that peak correlation value may also be identified. Additional details regarding the computation of correlation values is provided below with reference to FIG. 6.

Method 400 may proceed to operation 406 during which an estimated maximum correlation value may be determined based, at least in part, on the plurality of correlation values. Accordingly, interpolation operations may be implemented to generate an estimated peak correlation value based on the correlation values generated during operation 404. More specifically, the interpolation operations may implement one or more curve-fitting operations to generate a parabolic curve, such as a best-fit parabola, that may be represented by a quadratic equation. One or more computations may also be implemented to identify a peak or apex of the parabola. Such an apex may be a maximum value of the parabola that is identified as the data point to be used for the estimated peak correlation value, as may be represented on a y-axis, and the estimated time value discussed below that may be represented on an x-axis.

Method 400 may proceed to operation 408 during which an estimated timing value may be determined based on the estimated maximum correlation value. Accordingly, an estimated time value may be determined based on the estimated peak correlation value that was determined during operation 406. For example, a mathematical relationship between the values, such as a quadratic equation representing a parabola, may be used to identify the estimated time value.

It will be appreciated that while operation 406 and 408 have been discussed as separate operations for the purposes of clarify, they may be implemented concurrently as part of the same computational operation implemented during the interpolation operations. More specifically, both values may be determined as part of the identification of the apex of the parabola represented by the quadratic equation that results from the interpolation operations.

Figure 5:
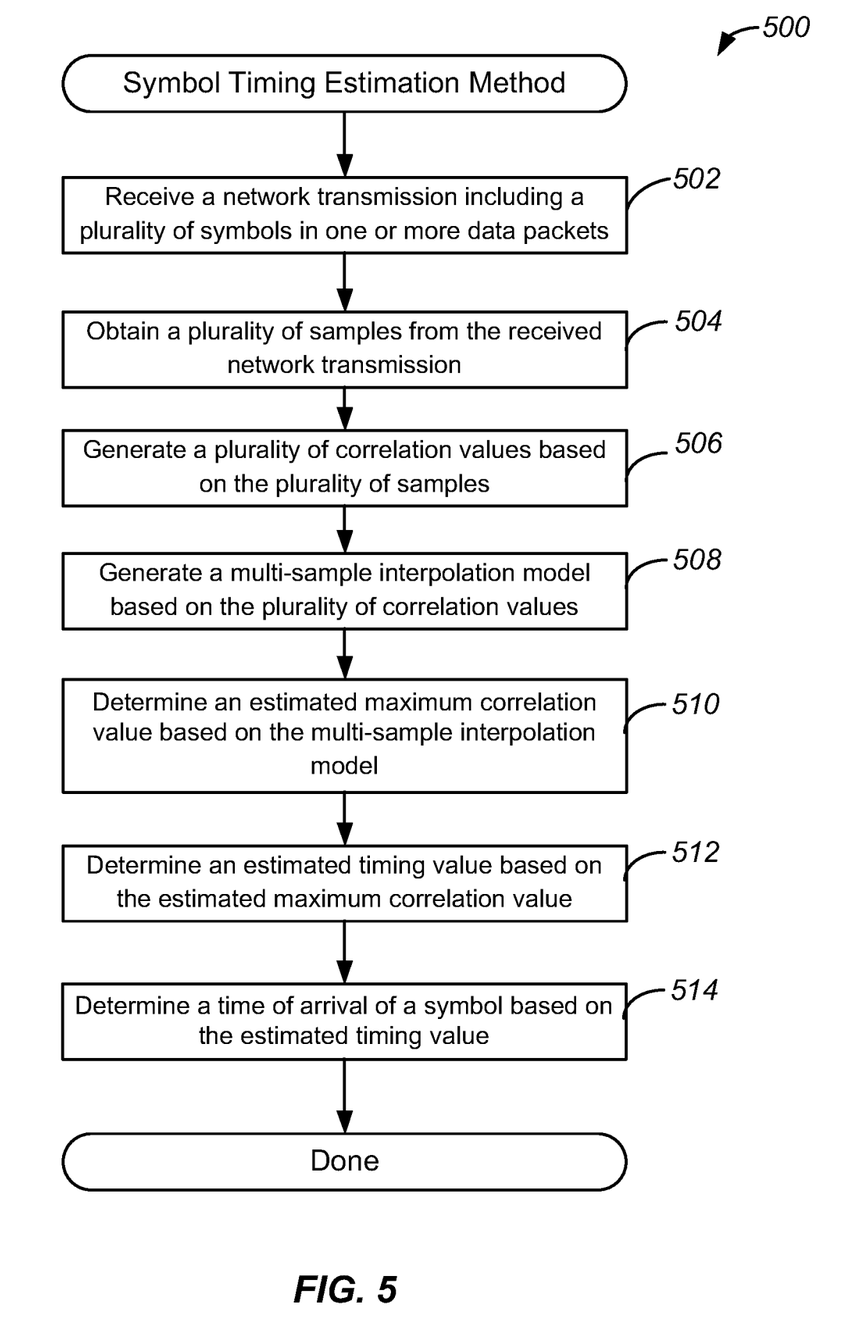
FIG. 5 illustrates an example of another method for timing recovery for wireless communications devices, implemented in accordance with some embodiments.

FIG. 5 illustrates an example of another method for timing recovery for wireless communications devices, implemented in accordance with some embodiments. As discussed above, transceivers may implement various operations associated with data packet reception, detection, and synchronization. As will be discussed in greater detail below, a method, such as method 500, may be implemented to improve the accuracy of time-of-arrival computations utilized by wireless communications devices.

Accordingly, method 500 may commence with operation 502 during which a network transmission including a stream of symbols may be received. As discussed above, a wireless communications device may be in communication with another wireless communications device and may receive a network transmission from that device. The network transmission may include a data stream that includes various data packets including data in the form of data symbols. Accordingly, during operation 502, a plurality of data symbols may be received, and one or more symbols may be used to implement synchronization operations.

Method 500 may proceed to operation 504 during which a plurality of samples may be obtained from the network transmission. As similarly discussed above, a component of a receiving transceiver may obtain multiple samples of a data packet included in the network transmission as it is received. Accordingly, multiple samples may be obtained for a received symbol at a designated sampling rate. It will be appreciated that the sampling rate may have a higher frequency than the symbol frequency of the network transmission.

Method 500 may proceed to operation 506 during which a plurality of correlation values may be generated based, at least in part, on the plurality of samples. As similarly discussed above, correlation values may be generated for each of the samples to identify how accurately the received samples correlate temporally with the reference data pattern. As will be discussed in greater detail below with reference to FIG. 6, for each received sample, multiple temporal shift values may be used to compute multiple correlation values. Moreover, during operation 506, a peak correlation value may be identified, and the peak correlation value may identify a sample that has a highest correlation value out of samples obtained for a symbol used during synchronization. Furthermore, a time associated with that peak correlation value may also be identified during operation 506.

Method 500 may proceed to operation 508 during which a multi-sample interpolation model may be generated based on the plurality of correlation values. In various embodiments, the multi-sample interpolation model may be a mathematical equation representing a best-fit curve that is fit to a portion of the generated correlation values. As will be discussed in greater detail below with reference to FIG. 6 and FIG. 7, correlation values adjacent to a peak correlation value may be used to provide the basis of the curve fitting. Accordingly, the multi-sample interpolation model may be used to generate a mathematical function that represents an approximation of correlation values as a function of time shift values underlying the correlation value computations, as discussed below with reference to FIG. 6.

Method 500 may proceed to operation 510 during which an estimated maximum correlation value may be determined based on the multi-sample interpolation model. As similarly discussed above, interpolation operations may be implemented to generate a multi-sample interpolation model, and the model may be used to identify an estimated peak correlation value. More specifically, the interpolation operations may include one or more curve-fitting operations to generate a best-fit parabola that may be represented by a quadratic equation or other suitable polynomial equation. One or more computations may also be implemented to identify a peak or apex of the parabola. Such an apex may be identified as the data point to be used for the estimated peak correlation value, as may be represented on a y-axis.

Method 500 may proceed to operation 512 during which an estimated timing value may be determined based on the estimated maximum correlation value. Accordingly, an estimated time value may be determined based on the estimated peak correlation value that was determined during operation 510. More specifically, a mathematical relationship between the values may be used to identify the estimated time value. For example, the estimated time value may be represented on an x-axis at the previously described apex of the parabola.

It will be appreciated that while operation 510 and 512 have been discussed as separate operations for the purposes of clarify, they may be implemented concurrently as part of the same computational operation implemented during the interpolation operations. More specifically, both values may be determined as part of the identification of the apex of the parabola represented by the quadratic equation that results from the interpolation operations.

Method 500 may proceed to operation 514 during which a time of arrival of a symbol may be determined based on the estimated time value. As previously discussed, the estimated time value may be used as a temporal offset value to compensate for temporal delays associated with data transmission and reception. Accordingly, a time indicator of a received data packet may be adjusted by the temporal offset value to compute a corrected time of arrival. More specifically, a time of arrival identified by a system component and represented as a time indicator when the data packet is received may be adjusted by subtracting the estimated time value, and the result may be stored as a corrected time of arrival.

Figure 6:
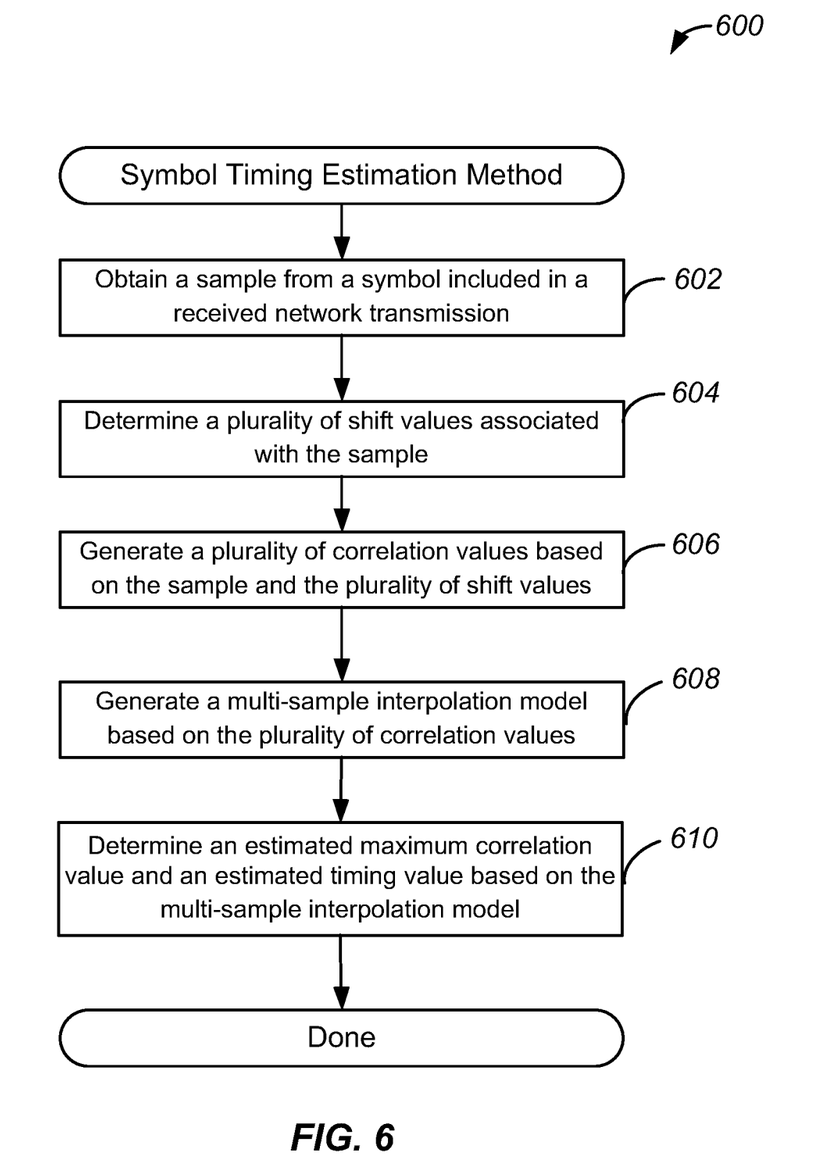
FIG. 6 illustrates an example of yet another method for timing recovery for wireless communications devices, implemented in accordance with some embodiments.

FIG. 6 illustrates an example of yet another method for timing recovery for wireless communications devices, implemented in accordance with some embodiments. As discussed above, transceivers may implement various operations associated with data packet reception, detection, and synchronization. As will be discussed in greater detail below, a method, such as method 500, may be implemented to improve the accuracy of time-of-arrival computations utilized by wireless communications devices.

Accordingly, method 600 may commence with operation 602 during which a sample may be obtained from a symbol included in a received network transmission. As similarly discussed above, a component of a receiving transceiver, such as a sampling unit of a packet synchronizer, may obtain samples of a data packet included in a network transmission. Accordingly, during operation 602, a sample may be received as part of a data packet synchronization process. As similarly discussed above, the sample may be obtained at a designated sampling rate that has a higher frequency than a symbol frequency of the network transmission.

Method 600 may proceed to operation 604 during which a plurality of shift values may be determined for the sample. In various embodiments, the shift values may be temporal shift values that represent temporal offsets from a time at which the sample was acquired. For example, the shift values may be a designated number of temporal offsets in a positive and negative direction from, or before and after, the time of acquisition of the sample. Accordingly, the shift values may be computed based on a designated number of values before and after a time of sample acquisition, and a designated amount of time between each shift value. Additional details regarding the shift values are discussed in greater detail below with reference to FIG. 7.

Method 600 may proceed to operation 606 during which a plurality of correlation values may be determined based on the sample and the plurality of shift values. Accordingly, the sample may be modified incrementally by the shift values, and correlation values may be computed based on a comparison with reference data, as may be determined by a known data pattern such as a sync word discussed above. Accordingly, the sample may be incrementally shifted by an amount determined by the shift values for each shift value, and a correlation value may be computed for each shift.

In one example, correlation values may be computed based on a similarity between a vector x and shifted copies of the vector (which may be additional instances of vector x indexed based on the shift value) that are generated as a function of shift values or lags. The correlation between discrete time sequence x[k] (where x[k] is a known reference pattern sequence) and y[k] (where y[k] is a received sample sequence) may be computed by equation 1 shown below where parameter k is any integer, $-\infty \leq k \leq \infty$:

$$R_{xy}[k] = \Sigma_{m=-\infty}^{\infty} x[m]y[m-k] \quad (1)$$

Method 600 may proceed to operation 608 during which a multi-sample interpolation model may be generated based on the plurality of correlation values. As similarly discussed above, the multi-sample interpolation model may be a mathematical equation representing a best-fit curve that is fit to a portion of the generated correlation values. Accordingly, a peak correlation value may be identified, and correlation values adjacent to a peak correlation value may be used to provide the basis of the curve fitting. More specifically, a correlation value corresponding to a shift value before and after the peak value may be used as the basis of the curve fitting. As discussed above, while the use of three correlation values has been described, any suitable number of correlation values may be used for curve fitting.

In one example, curve fitting may be implemented using polynomial interpolation. For example, an equation for an inverted parabola may be given by equation 2 shown below:

$$y = f(t) = a_2 t^2 + a_1 t + a_0 \quad (2)$$

Equation 2 may be used to interpolate a timing-correlation curve, as will be discussed in greater detail below with reference to at least FIG. 7. To implement such interpolation, a set of equations may be used, such as equations 3, 4, and 5 shown below:

$$c_1 = a_2 t_1^2 + a_1 t_1 + a_0 \quad (3)$$

$$c_2 = a_2 t_2^2 + a_1 t_2 + a_0 \quad (4)$$

$$c_3 = a_2 t_3^2 + a_1 t_3 + a_0 \quad (5)$$

In such equations, $t_1 = t_0 - t_s$, $t_2 = t_0$, $t_3 = t_0 + t_s$. These equations may be expressed in matrix form as well, as shown in Equation 6 shown below:

$$\begin{bmatrix} t_1^2 & t_1 & 1 \\ t_2^2 & t_2 & 1 \\ t_3^2 & t_3 & 1 \end{bmatrix} \begin{bmatrix} a_2 \\ a_1 \\ a_0 \end{bmatrix} = \begin{bmatrix} c_1 \\ c_2 \\ c_3 \end{bmatrix} \quad (6)$$

In various embodiments, any suitable computation technique, such as a gaussian elimination method may be used to solve for $a_2$, $a_1$ and $a_0$. As will be discussed in greater detail below, an estimated timing value may be determined by equation 7 shown below:

$$t_x = -a_1/2a_2 \quad (7)$$

Accordingly, method 600 may proceed to operation 610 during which an estimated maximum correlation value and an estimated timing value may be determined based on the multi-sample interpolation model. As similarly discussed above, interpolation operations may be implemented to generate a multi-sample interpolation model, and the model may be used to identify an estimated peak correlation value. More specifically, the interpolation operations may include one or more curve-fitting operations to generate a best-fit parabola that may be represented by a quadratic equation or other suitable polynomial equation. One or more computations may also be implemented to identify a peak or apex of the parabola. For example, a vertex of a parabola may be identified by identifying a point at which the parabola crosses its axis of symmetry. Any suitable computation may be used for such vertex identification. In various embodiments, the apex may be identified as the data point to be used for the estimated peak correlation value, as may be represented on a y-axis, as well as the estimated time value, as may be represented on the x-axis. As noted above, the estimated peak correlation value as well as the estimated time value may be stored in memory and/or provided to a downstream system component for data reception and time of arrival computations.

Figure 7:
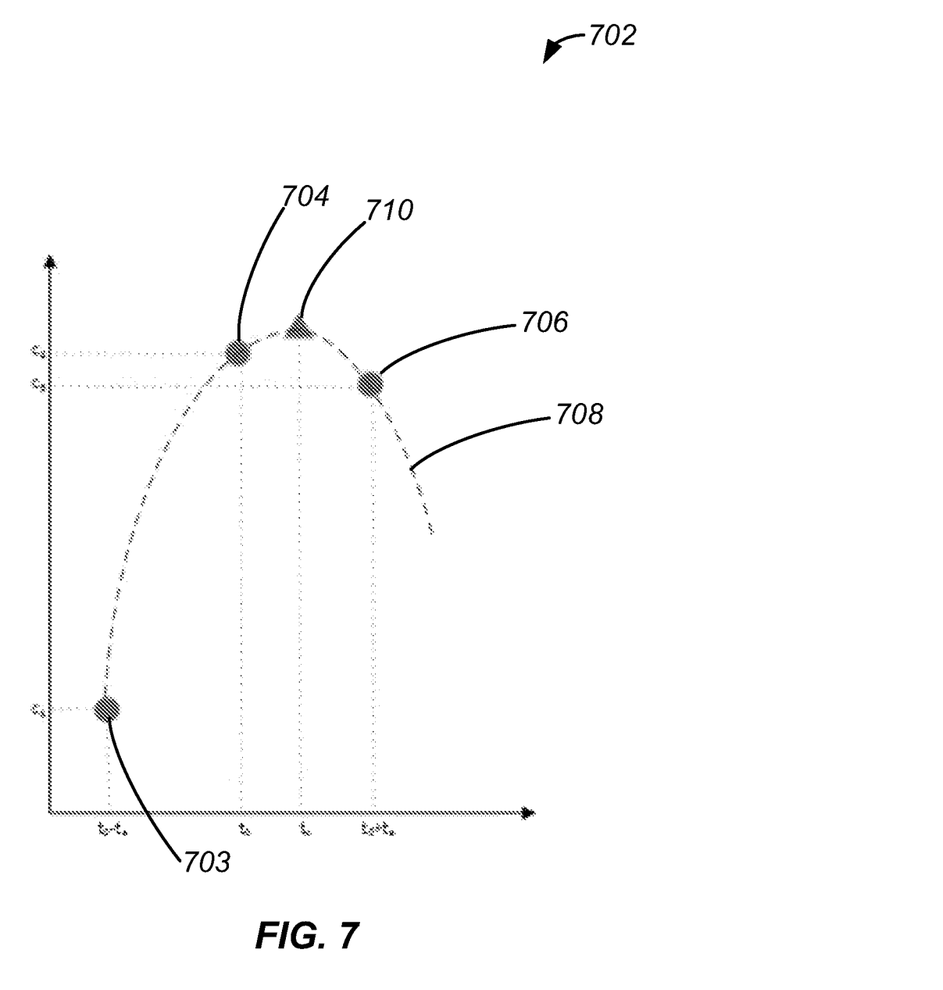
FIG. 7 illustrates an example of a diagram of timing estimation, implemented in accordance with some embodiments.

FIG. 7 illustrates an example of a diagram of timing estimation, implemented in accordance with some embodiments. Accordingly, FIG. 7 illustrates graph 702 which provides a graphical representation of multiple correlation values as well as a best fit line that has been generated for those correlation values. More specifically, graph 702 includes correlation value 703, correlation value 704, and correlation value 706. As shown in FIG. 7, correlation value 704 has been identified as the peak correlation value for a sample as it has the highest correlation value, as illustrated along the y-axis. Moreover, correlation value 703 corresponds to a correlation value computed for an increment of a shift value before the peak correlation value, and correlation value 706 corresponds to a correlation value computed for an increment of a shift value after the peak correlation value. Curve 708 has been fit to the three correlation values and is shown as an inverted parabola. As also shown in FIG. 7, an apex of the parabola is shown at point 710. Accordingly, point 710 represents an estimate of a peak correlation value and a time value associated with that peak correlation value. The difference between the time of correlation value 704 and point 710 may be stored as an estimated time value that may be used as a temporal offset for subsequent computations.

Accordingly, as shown in FIG. 7, the curve fitting provided by embodiments disclosed herein provides a refined estimate of the peak correlation as well as a time shift associated with that peak correlation. The increased accuracy provided by this refined estimate enables increased performance, throughput, and communication link stability amongst wireless communications devices disclosed herein.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
receiving, at a transceiver of a wireless communications device, at least one symbol included in a data transmission;
obtaining a plurality of samples of the at least one symbol;
generating, using one or more processors, a plurality of correlation values for each of the plurality of samples;
generating, using the one or more processors, a multi-sample interpolation model based on at least some of the plurality of correlation values; and
determining, using the one or more processors, an estimated maximum correlation value and a temporal offset value based on the multi-sample interpolation model, the temporal offset value being used for a time of arrival computation.

2. The method of claim 1, wherein the plurality of correlation values is generated based on a plurality of temporal shift values.

3. The method of claim 2, wherein the generating of the multi-sample interpolation model comprises:
determining, using the one or more processors, a best fit curve based on the at least some of the plurality of correlation values.

4. The method of claim 3, wherein the best fit curve is parabolic.

5. The method of claim 4, wherein the estimated maximum correlation value and the temporal offset value are determined based on a maximum value of the best fit curve.

6. The method of claim 1, wherein the at least one symbol is included in a Bluetooth data packet.

7. The method of claim 6, wherein the Bluetooth data packet is a Bluetooth Low Energy data packet.

8. The method of claim 1 further comprising:
determining a corrected time of arrival based on a time indicator associated with a sample and the temporal offset value.

9. The method of claim 1, wherein the obtaining of the plurality of samples is implemented during one or more synchronization operations associated with a wireless communications device.

10. A device comprising:
a memory configured to store a plurality of data values associated with a data transmission from a wireless communications device; and
one or more processors configured to:
receive at least one symbol included in the data transmission;
obtain a plurality of samples of the at least one symbol and store the plurality of samples in the memory;
generate a plurality of correlation values for each of the plurality of samples;
access the memory and generate a multi-sample interpolation model based on at least some of the plurality of correlation values; and
determine an estimated maximum correlation value and a temporal offset value based on the multi-sample interpolation model, the temporal offset value being used for a time of arrival computation.

11. The device of claim 10, wherein the plurality of correlation values is generated based on a plurality of temporal shift values.

12. The device of claim 11, wherein the multi-sample interpolation model is a best fit curve determined based on the at least some of the plurality of correlation values.

13. The device of claim 12, wherein the estimated maximum correlation value and the temporal offset value are determined based on a maximum value of the best fit curve.

14. The device of claim 10, wherein the at least one symbol is included in a Bluetooth data packet.

15. The device of claim 10, wherein the one or more processors are further configured to:
determine a corrected time of arrival based on a time indicator associated with a sample and the temporal offset value.

16. A system comprising:
an antenna configured to receive a data transmission comprising a plurality of Bluetooth data packets;
a transceiver comprising one or more processors configured to:
receive at least one symbol included in the data transmission;
obtain a plurality of samples of the at least one symbol;
generate a plurality of correlation values for each of the plurality of samples;
generate a multi-sample interpolation model based on at least some of the plurality of correlation values; and determine an estimated maximum correlation value and a temporal offset value based on the multi-sample interpolation model, the temporal offset value being used for a time of arrival computation; and a memory device configured to store the estimated maximum correlation value and the temporal offset value.

17. The system of claim 16, wherein the plurality of correlation values is generated based on a plurality of temporal shift values.

18. The system of claim 17, wherein the multi-sample interpolation model is a best fit curve determined based on the at least some of the plurality of correlation values.

19. The system of claim 18, wherein the estimated maximum correlation value and the temporal offset value are determined based on a maximum value of the best fit curve.

20. The system of claim 16, wherein the one or more processors are further configured to:
    determine a corrected time of arrival based on a time indicator associated with a sample and the temporal offset value.

* * * * *